Figure 8:
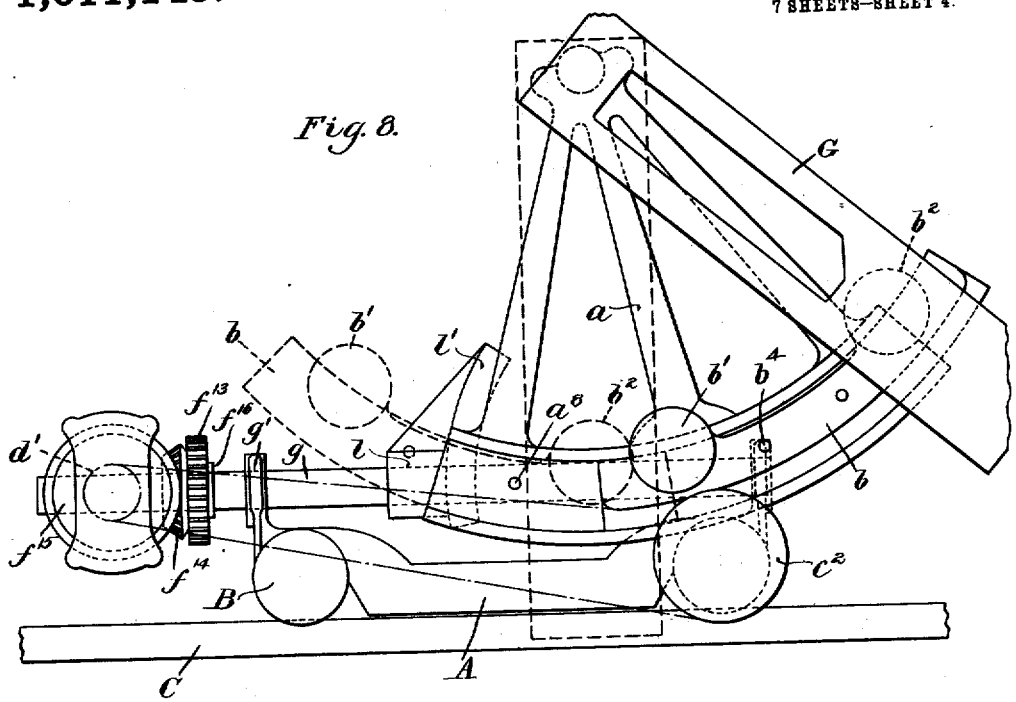

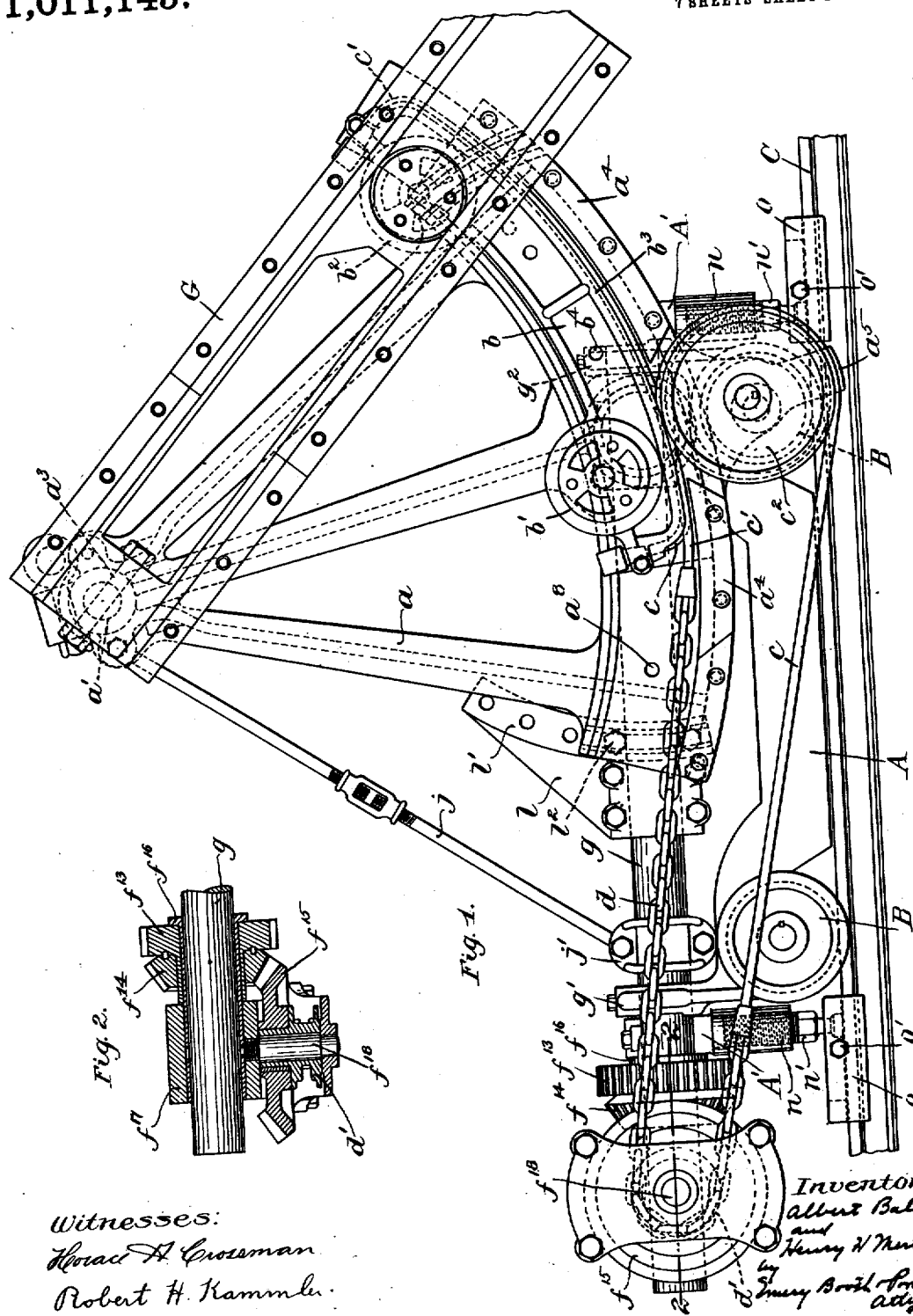

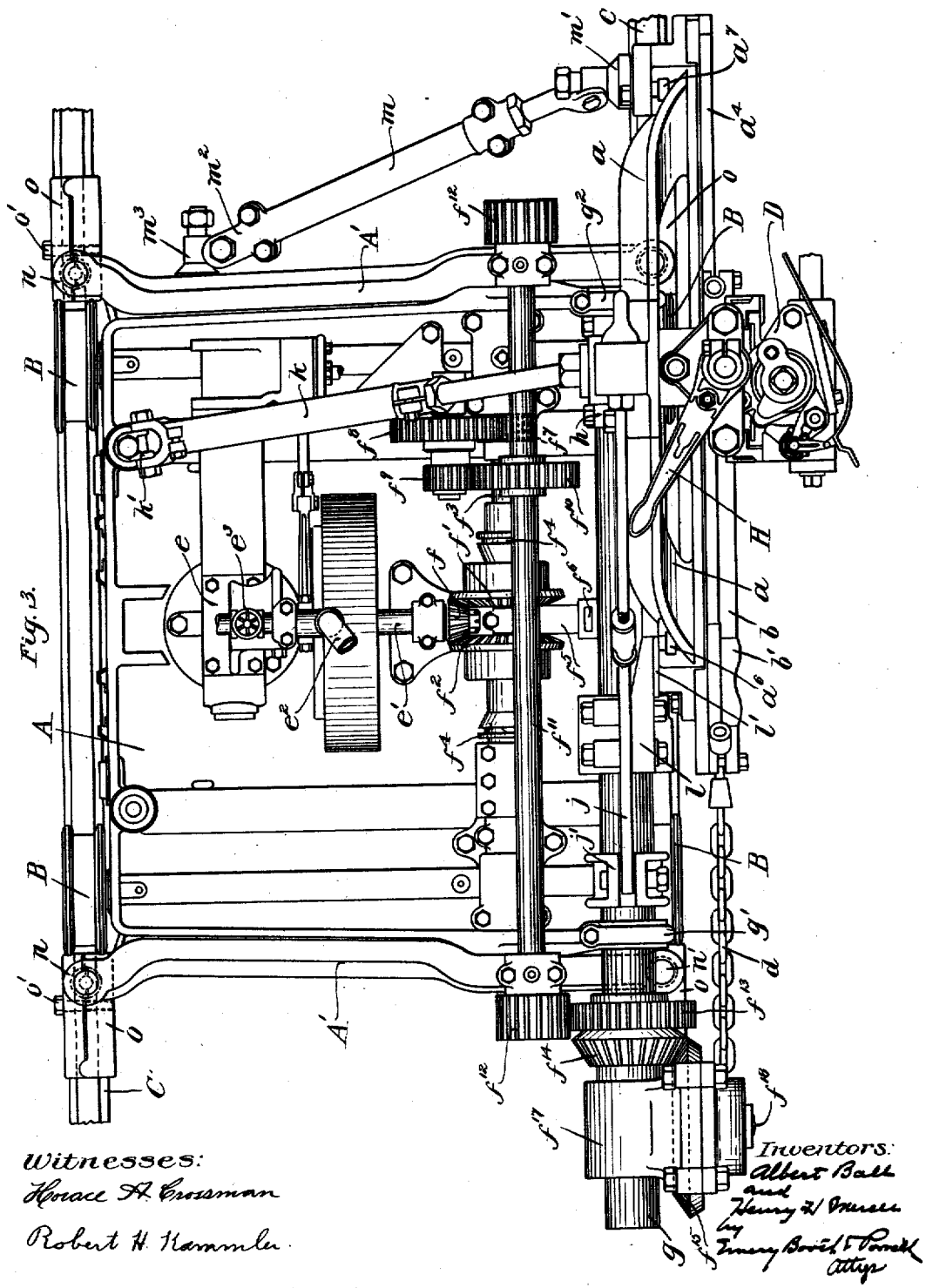

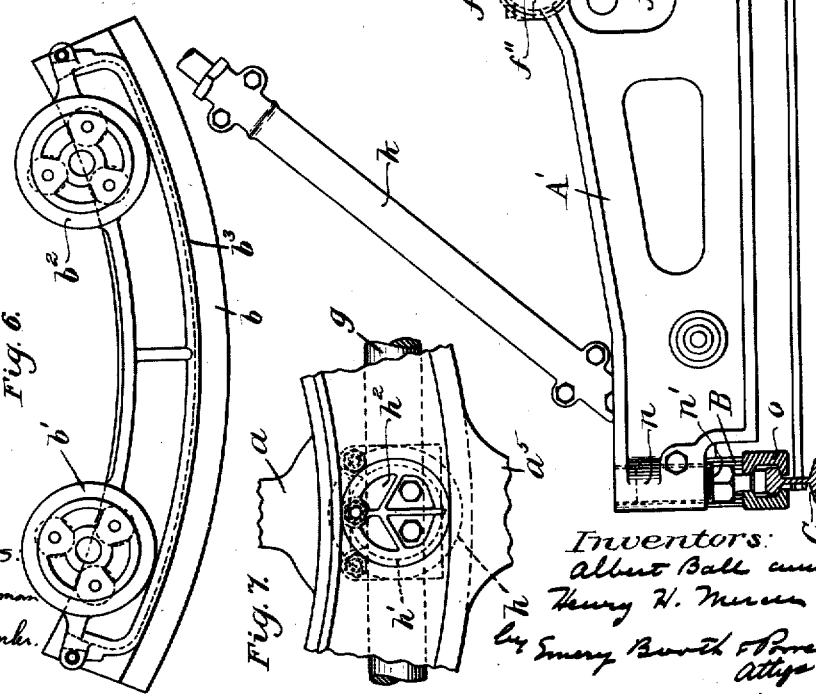

A. BALL & H. H. MERCER.
STONE CUTTING MACHINE.
APPLICATION FILED OCT. 30, 1905.

1,011,145.

Patented Dec. 12, 1911.
7 SHEETS—SHEET 4.

Witnesses:
Horace A. Crossman.
Robert H. Kammler.

Inventors:
Albert Ball and
Henry H. Mercer
by Emery Booth Powell
attys

A. BALL & H. H. MERCER.
STONE CUTTING MACHINE.
APPLICATION FILED OCT. 30, 1905.

1,011,145.

Patented Dec. 12, 1911.
7 SHEETS—SHEET 5.

WITNESSES.
Horace A. Crossman
Robert H. Kammler.

INVENTORS:
Albert Ball and
Henry H. Mercer
by Emery Booth & Powell
Attys.

A. BALL & H. H. MERCER.
STONE CUTTING MACHINE.
APPLICATION FILED OCT. 30, 1905.

1,011,145.

Patented Dec. 12, 1911.
7 SHEETS—SHEET 6.

Witnesses
Adolph C. Kaiser.
Archie B. Colbath.

Inventor:
Albert Ball and
Henry H. Mercer
by Emery Booth
attorneys

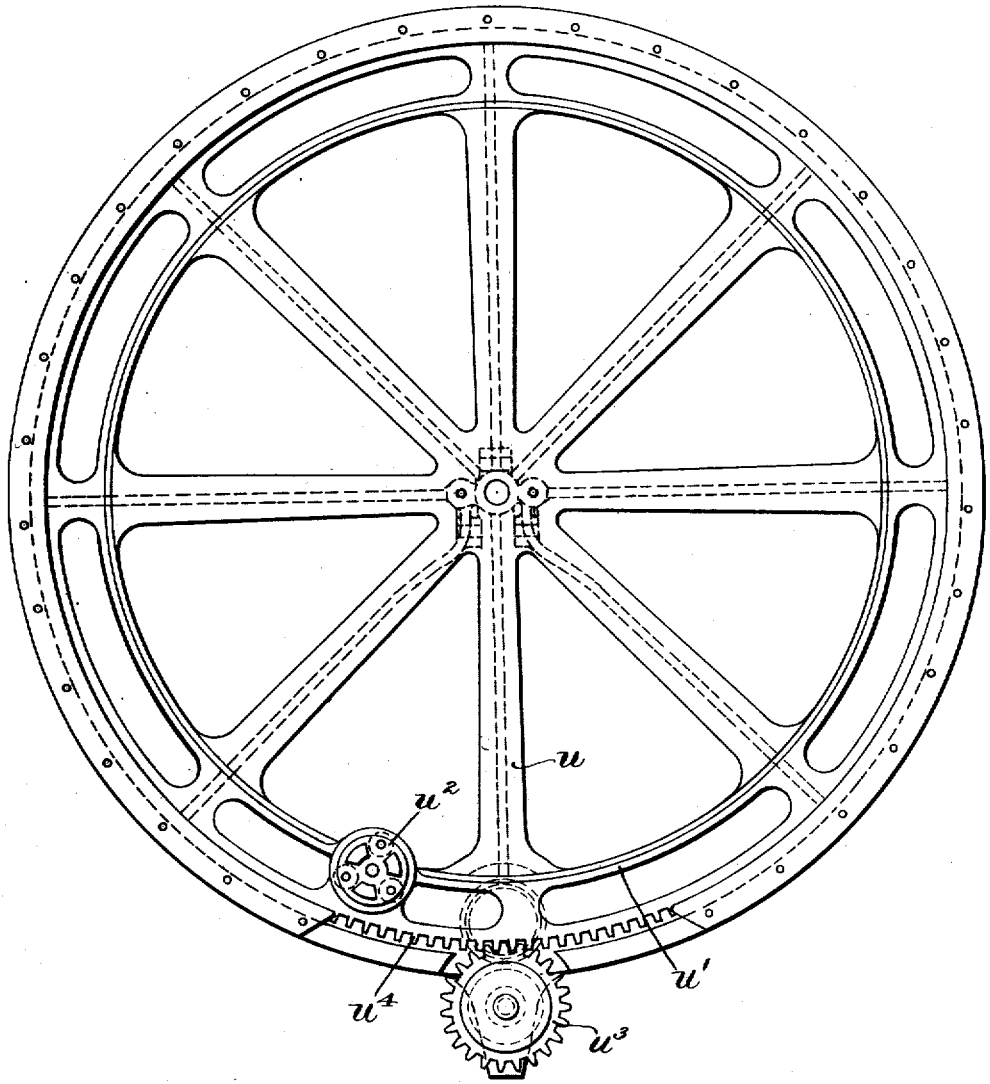

UNITED STATES PATENT OFFICE.

ALBERT BALL AND HENRY H. MERCER, OF CLAREMONT, NEW HAMPSHIRE, ASSIGNORS TO SULLIVAN MACHINERY COMPANY, OF CLAREMONT, NEW HAMPSHIRE, A CORPORATION OF MAINE.

STONE-CUTTING MACHINE.

1,011,145.

Specification of Letters Patent. Patented Dec. 12, 1911.

Application filed October 30, 1905. Serial No. 284,993.

*To all whom it may concern:*

Be it known that we, ALBERT BALL and HENRY H. MERCER, both citizens of the United States, and residents of Claremont, County of Sullivan, State of New Hampshire, have invented an Improvement in Stone-Cutting Machines, of which the following description, in connection with the accompanying drawings, is a specification, like letters on the drawings representing like parts.

Our invention relates to stone working machines, the purpose thereof being to increase the effectiveness of such machines.

Our invention may be applied to stone working machines of various types and for various purposes, but its purpose will be sufficiently understood from the following described and illustrated embodiment thereof where it is shown applied to a track channeling machine constructed for angle cutting, that is to say, for cutting a channel groove, the plane of which may be either perpendicular or inclined to the plane along which the channel travels. A machine of this kind is often required to carry its channel groove toward and under an overhanging wall or other obstruction which is so situated as to interfere with the cutting of the end of the groove if it be attempted to operate the machine in the ordinary way. This is of frequent occurrence in quarry working, where for the purpose of reaching valuable underlying areas of stone without unnecessary surface excavation of worthless material, or to follow formation pitches, or for other reasons, the said walls of the quarry are cut obliquely instead of vertically, forming an acute angle with the quarry floor, and the sides of each strata being cut under the sides of the preceding one. The cutting of the channel groove into the acute angle or corner underlying the side is usually termed corner-cutting.

In corner-cutting the lift and length of the cutter-head prevents carrying the cut under the overhanging wall and into the acute angle formed between the same and the floor without some adjustment of the cutter-head. To carry the groove to the end of the quarry floor it has been usual to mount the cutter-head so that the former may be adjusted to the inclination of the side wall and the inclined cutter-head then moved in under the latter to complete the groove. The channeler, therefore, whether cutting a groove perpendicular or inclined to the plane of travel, is progressively advanced across the quarry floor, operating in the usual manner until it approaches close enough to the oblique side wall to have its further cutter movement obstructed thereby. The machine is then stopped and the cutter-head loosened and inclined forwardly at the angle of the wall and there fixed in position. The channeler, after first being slightly retracted, is caused to advance to carry the groove to the end of the floor, the forward reach of the tool permitting it to be cut close to the wall. This method of corner-cutting permits the groove to be carried to the end of the quarry floor but is quite slow and inefficient since the inclined tool strikes the stone at the bottom of the groove at an angle instead of perpendicularly. Increasing the angular inclination of the cutting tool decreases the effectiveness of the blow and when an inclination of approximately 26° is exceeded, the tool fails actually to cut but slides over the stone at each stroke and the groove is formed by the slow process of frictionally wearing away the substance of the stone. When it is considered that the inclination of the quarry side walls sometimes reaches an angle of 45°, it will be comprehended, as is the case, that the completion of the channel groove beneath the overhanging side is a slow and inefficient process with the usual form of channeling machine.

One object of our invention is to provide a channeling or other like machine with means for completing its channel groove when under an obstruction like the oblique side wall of a quarry, without sacrificing so much of the effectiveness which the machine possesses when cutting in the open. Such means may be applied to machines other than channeling machines, and for the avoidance of obstructions other than oblique quarry side walls, and such means may be embodied in a variety of constructions, but in the present instance we have provided a track, angle-cutting channeler with a cutting head so mounted that, operating as usual in the open, it may be made to cut under the overhanging side walls while working along the arc of a circle delivering its blows perpendicularly to the bottom of the groove, thereby losing none of the effectiveness of its cutting stroke.

Our invention also has other objects both connected and disconnected from the above and these as well as the principles of our invention will be best understood by reference to the following description taken in connection with the accompanying illustration of one specific embodiment thereof, while its scope will be more particularly pointed out in the appended claims.

Figure 9:
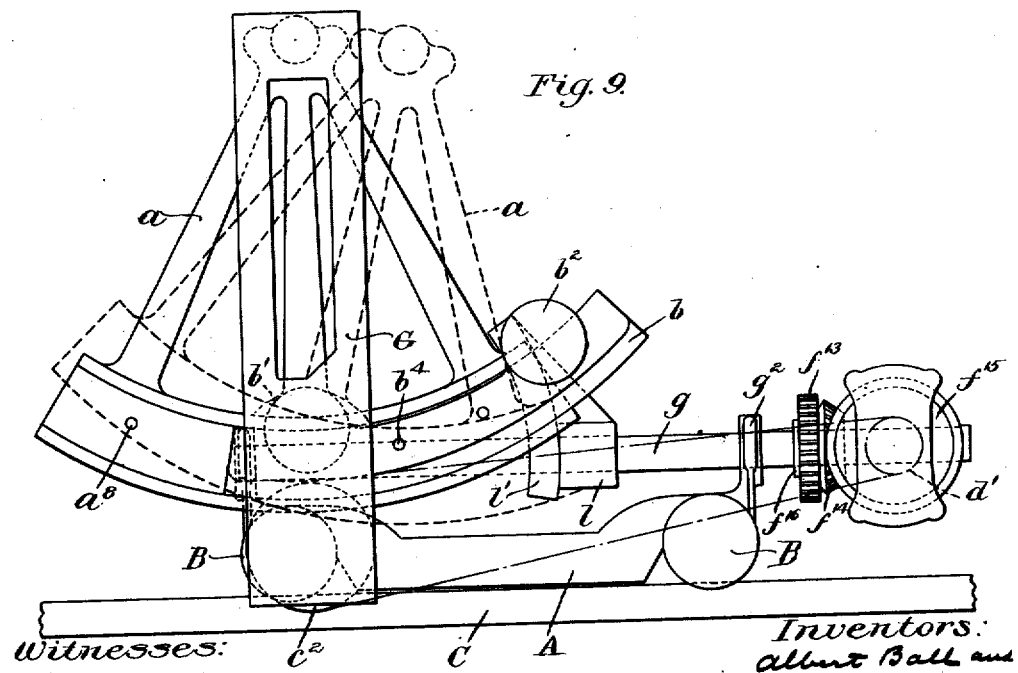
Figure 10:
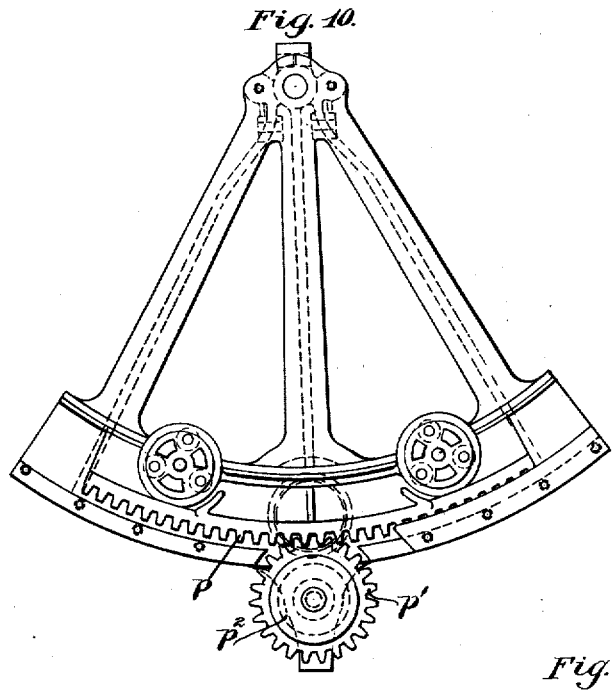
Figure 18:
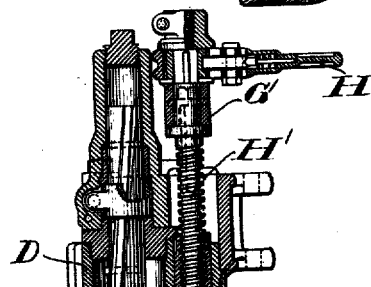

In the drawings,—Figure 1 is a front elevation showing a machine embodying one form of our invention and having its cutter-head adjusted for corner-cutting at the right of the machine, the cutting engine and cutting tools being removed for sake of clearness; Fig. 2 is a section in plan taken on the line 2—2 through the gear box at the end of the trunnion; Fig. 3 is a plan view of the machine shown in Fig. 1, the cutter-head being here shown as swung to a vertical position instead of the oblique position in Fig. 1; Fig. 4 is an end elevation; Fig. 5 is a vertical section, partially broken away, taken through the supporting standard and the sliding segment; Fig. 6 is a detail of the sliding segment; Fig. 7 is a fragmentary view showing the attachment of the trunnion clamp to the standard; Fig. 8 is a diagrammatic view showing the different positions assumed by the cutter head and segment in corner-cutting; Fig. 9 is another diagrammatic view showing the adjustment of the several parts of the machine to a reversed position for corner-cutting at the opposite end thereof; Fig. 10 shows in front elevation, and Fig. 11 in section, a modified construction of the segment operating mechanism; Fig. 12 shows in side elevation, and Fig. 13 in section, another modification; Figs. 14, 15, 16 and 17, other modified forms of mechanism for moving the segment, and Fig. 18 is a sectional elevation taken through the cutter-head, showing the tool feeding mechanism.

Referring to the drawings and more particularly to Figs. 1 to 6, and to the illustrative embodiment of our invention there shown, the machine is supported upon a frame or carriage A having the two end hangers A'. Upon the frame are mounted two pairs of trucks B, the latter tracking with the rails C which are customarily laid upon the quarry floor and along which the machine when cutting in the usual way is advanced by any suitable or ordinary means.

The cutter engine D, cross head E and percussive cutting tool F (Figs. 4 and 18) are carried upon the cutter-head G, and during operation of the machine, as the channel groove deepens, are advanced down and along suitable guide-ways in the cutter-head by any usual or well-known tool-feeding mechanism employed upon machines of this class. A conventional representation of such tool-feeding mechanism is indicated in Fig. 3 and particularly Fig. 18, where there is provided the feed screw H' having threaded engagement with the engine cylinder D, or parts attached thereto, and having its upper end journaled in the bracket G' bolted to the upper end of the cutter-head. To the end of the feed screw is attached through a suitable ratchet and pawl connection, the handle H by means of which the screw may be turned at will and the tool advanced step by step toward the work.

During the cutting of the ordinary channel groove the cutter-head is fixedly held, as shown in full lines in Fig. 9, either vertically or, when angle cutting is desired, inclined backward and to the plane of the drawing; but when used for cutting corners, it is not only tilted forward to cut under the overhanging side wall of the quarry, but is given an oscillating movement, so that the tool travels in an arc-like path and its blows are delivered radially from the center of oscillation of the cutter-head. To this end, the cutter head at its upper end is swiveled upon a sector-like standard or support $a$, there being provided for this purpose (Figs. 4 and 5) a trunnion pin $a'$, carrying the vertically drilled head $a^2$, to which the cutter-head is pivotally secured by the pin $a^3$, this vertical pivotal attachment preventing any binding in the swinging movement of the cutter-head to be described.

The sector-standard or support, which may be adjusted to a variety of different positions, is fixedly held during operation of the machine and is provided near its base with a curved finished guide-way in which is mounted for sliding movement the curved actuator segment $b$. This actuator or actuator segment, which is shown in detail Fig. 6, is provided with two raised seats or spottings $b'$ and $b^2$, to either of which the cutter-head may be bolted, it being shown in Fig. 1 secured to the right-hand one of the two seats and diagrammatically indicated in Fig. 9 as secured to the left-hand one. The segmental slide may therefore be moved in either direction in its guide-way in the standard $a$, being retained therein by the gibs $a^4$ which overlie the lower face of the slide when the latter is in position, so that the slide when moved to the right or the left as viewed in Fig. 1 causes the cutter-head to swing with it about the trunnion pin $a'$ as a center.

For the reciprocatory actuation of the cutter-head in this manner during corner-cutting, the slide is connected at one end with a wire rope $c$, or other like flexible connection, and at its opposite end with a similar rope $c'$. These ropes may be fastened to the ends of the slide in any suitable way, as by the clamping devices shown, and are connected respectively to opposite ends of the driving chain $d$, which latter passes over the sprocket wheel $d'$ at the end of the machine. The rope $c'$ is directly connected to the end of the chain, but the rope $c$ first passes about the sheave $c^2$ which is rotatably carried by a depending tongue $a^5$ at the bottom of the sector and acts to reverse the direction of travel of the rope. The segmental slide is provided with a forwardly projecting wall $b^3$ (Fig. 5) the under face of which has a double groove for the reception of the wire ropes, so that the latter draw against the grooved edge thereof and pull evenly upon the segment in any portion thereof.

Any suitable means for causing reciprocating driving movement of the sprocket $d'$ and thereby the oscillating movement of the cutter-head, may be employed, but herein we have shown a special tool actuating engine $e$ (shown only in Fig. 3) which turns the transverse driving shaft $e'$, being connected by the flexible connection $e^2$ to the source of pressure supply (not shown) and being controlled as to speed by its own throttle valve $e^3$. The transverse shaft $e'$ carries at its end the beveled pinion $f$ which imparts opposite but equal rotation to the two bevel gears $f'$ and $f^2$, which may be separately clutched to and unclutched from the clutch shaft $f^3$ by sliding movement of the double clutch member $f^4$. Movement of the latter is effected by movement of the shifting controller $f^5$, which has an aperture $f^6$ into which may be thrust a hand lever, the handle (not shown) of which is conveniently positioned for grasp by the operator. The clutch member may be shifted by the hand lever to clutch either the gear $f'$ or gear $f^2$ to the shaft $f^3$, or left in an intermediate position wherein neither gear engages the shaft and the latter remains stationary.

The shaft $f^3$ has a pinion $f^7$ which meshes with the counter-shaft gear $f^8$ driving the counter-shaft pinion $f^9$, which in turn meshes with the gear $f^{10}$ upon the main counter-shaft $f^{11}$. The latter carries at each end a pinion $f^{12}$, one of which meshes with the gear $f^{13}$, the latter being secured (Fig. 2) to the beveled pinion $f^{14}$, through which driving movement is imparted to the bevel gear $f^{15}$ and the sprocket wheel $d'$ keyed, or otherwise secured, thereto. The gears $f^{13}$ and $f^{14}$ are revolubly mounted upon the sleeve $f^{16}$, the latter fixedly secured within the clamping bracket $f^{17}$, and the gear $f^{15}$ and sprocket $d'$ are revolubly mounted upon the pin $f^{18}$, also secured to said bracket, these several gearing elements constituting, together with the bracket a removable gearing mechanism, such that if the bracket is unclamped from the end of the trunnion shaft $g$, said gears may be withdrawn with the bracket as a single piece.

By means of the reduction gearing described, the tool actuating engine $e$ when running turns the sprocket $d'$, thereby causing travel of the chain $d$ and a comparatively slow swinging movement of the cutter-head about its trunnion pin. When the swinging movement has advanced far enough in one direction, the shifting controller $f^5$ may be thrown and movement reversed, this oscillating movement of the cutter-head being continued during the cutting of the corner and permitting thereby the radial action of the tool upon the bottom of the channel groove underlying the inclined quarry wall. As the groove deepens and the arc of the tool-travel increases in length, the tool will pass over the groove-bottom more rapidly, but to offset this the engine speed may be gradually reduced, if desired, in proportion to the depth of cut, or the engine speed may remain the same for all depths of channel cut, being adjusted at the outset for what is correct for midway the cut and approximated only above and below that point.

Since the cutter head is swung mechanically by its connections to the engine it may be made to execute its predetermined movement with the utmost precision. This permits the rate of swinging movement during any given swing to be maintained substantially uniform if desired so that a true arc-like formation may be maintained at the bottom of the deepening channel groove.

For cutting different corner angles, the standard $a$ may be adjustably inclined about the trunnion box $h$, which latter (Figs. 1, 5 and 7) during operation of the machine fixedly secures the standard to the trunnion shaft $g$, the latter in turn being clamped at $g'$ and $g^2$ to the frame of the machine. The trunnion box is split and is provided with clamping screws by which it may be clamped to the trunnion shaft and is also provided with a trunnion $h'$ which (Figs. 5 and 7) extends into an aperture in the lower part of the standard. The latter is effectively secured to the trunnion box by the trunnion plate $h^2$ lying behind the sliding segment and fitting a shouldered recess formed in the outer face of the standard and in the end of the trunnion aperture, being united to the trunnion by the three clamping bolts shown. When the machine is in operation these clamping bolts are set up tight, thereby immovably clamping the sector to the trunnion; when it is desired to adjust the support to a different angle these bolts may be loosened and the support adjusted about the trunnion to the desired inclination (see Fig. 9), where it is again clamped.

In addition to its attachment to the trunnion box, the support $a$ is suitably braced and rigidly held at the top and bottom. The extensible brace rod $j$ in line with the trunnion shaft is fastened at its upper end to the top of the standard and, extending downward and outward lengthwise the machine, is secured at its lower end to a sleeve $j'$ adjustably clamped upon the trunnion shaft $g$. The top of the standard is also supported by the extensible back brace $k$ which is jointed by a universal connection to a clamping plate $k'$ bolted to a seat upon the frame.

The lower portion of the sector-standard containing the segmental guide-way is braced against either longitudinal or lateral displacement by means of the end braces $l$ (Figs. 1 and 3) and $m$ (Fig. 3). The former is clamped to the trunnion shaft and has a segmental bearing face $l'$ against which rests the corresponding bearing face on the back of the guide support, the latter, however, being formed with a curved T slot $a^6$ (Fig. 3) formed with the axis of the trunnion $h'$ as a center. By means of one or more bolts $l^2$ carried by the brace $l$, the threaded ends of which carry nuts working within the curved T slot, the end of the guide support may be clamped against the bearing face of the end braces in any position to which it may be adjusted about the trunnion as a center. The bearing face is elongated and perforated in a number of places, as shown, so that the clamping bolts may be located in different positions to correspond to different inclinations of the support. The opposite end of the guide support is provided with a similar T slot $a^7$ (Fig. 3), and a similar bearing face, there being engaged therewith, however, instead of the segmental brace $l$ with a plurality of bolts, a clamping plate $m'$ having a single bolt jointed to the extensible brace rod $m$, the latter being connected by the universal joint $m^2$ to the plate $m^3$ which is mounted on a stud, the latter bolted to the side of the frame. The opposite transverse frame member has a threaded boss (see Fig. 4), to which the same plate $m^3$, may be bolted for reverse adjustment of the apparatus.

The mode of adjusting the standard will now be apparent.

With the machine adjusted as shown in Fig. 1, if it is desired to increase or decrease the inclination of the support for corner-cutting at a different angle, the trunnion plate $h^2$ is freed by loosening its clamping bolts and the support tipped forward or backward lengthwise the machine about the trunnion as a center, the support being temporarily loosened for adjustment from the end braces $l$ and $m$, the side brace $j$ and the back brace $k$. When the support is given the desired inclination, it is again made fast to the end braces and the back and side braces are adjusted to the changed position of the support. The back brace requires only to be lengthened or shortened slightly; the side brace $j$ may be lengthened or shortened or adjusted to a new position upon the trunnion shaft. When extreme angles are needed, braces of various lengths may be used. The end braces are freed by unclamping the nuts which work in the T slots $a^6$ and $a^7$, adjusting the braces themselves and again clamping the nuts up in the new position of the support.

The flexible driving connection between the sliding actuator segment and the driving gearing permits all necessary adjustment of the support without affecting the alinement of connected parts.

When it is desired to cut in the opposite direction to what is shown in Fig. 1, that is to say, to cut a corner at the opposite end of the machine, the entire corner-cutting mechanism can be reversed into the position diagrammatically shown in Fig. 9; the cutter-head $g$ is removed from the seat or spotting $b^2$ and secured to the seat $b'$; the clamping bracket $f^{17}$ is loosened and withdrawn from the end of the trunnion shaft $g$; all parts are loosened from the trunnion shaft and the latter is freed from the frame and is pushed through so as to overhang at the opposite end of the frame and upon this overhanging end the clamping bracket is then secured in reverse relation. Obviously, if desired, for the purposes of reversing the mechanism, the trunnion shaft may be long enough to overhang the machine at either end. The trunnion box is unclamped and moved to the left-hand end of the machine, as viewed in Fig. 1, the parts assuming the general position indicated in Fig. 9. The several brace rods are reversed, the back brace being disconnected from the seat shown in Fig. 3 at the right of the frame and secured to the corresponding seat shown at the left thereof, the end brace $m$ is transferred to the left-hand side of the machine, and the side brace $j$ transferred from the left-hand end of the trunnion shaft to the right-hand end thereof. The brace $l$ is replaced by one similar in construction and form but reversely arranged. The entire machine is therefore reversible and, with slight change in adjustment, may be used for corner-cutting at either end thereof.

When the machine is employed for cutting the ordinary channel groove in the open, the support will be adjusted to a mean upright position such as is shown in full lines in Fig. 9. Under these conditions the tool engine $e$ is disconnected from the oscillating mechanism. Under these circumstances the segment is prevented from sliding in its support by any suitable locking devices, such as a pin placed in the then alining holes $a^8$ and $b^4$ in the support and segment, respectively; the segment being fixedly held in such position as to bring the cutter-head upright as shown in Fig. 9.

For angle cutting, either with the ordinary channel groove or in corners, the entire support, with the cutter-head, segment, driving chain, sprocket and gears, may be tipped back (relatively to the plane of the drawing in Fig. 1) by merely loosening the clamps $q'$ and $q^2$ which hold the trunnion shaft, freeing the back brace $k$ and the end brace $m$ and resetting them when the support is given its desired inclination.

During the cutting of the ordinary channel groove the channeler is caused to traverse the track-way, as usual but in corner-cutting it is desirable to have it maintained stationary. Any suitable devices may be employed for this purpose, but we have herein shown means for lifting the entire machine bodily from the track and there rigidly holding it during the cutting of the corner. For this purpose the hangers A, A' are provided at their ends with lugs $n$ which are vertically threaded to receive the jack screws $n'$, the latter having feet which aline with and are directly over the top of the rails (Fig. 4). The enlarged feet of these jack screws fit a socket in a split clamp $o$, the two halves of which may be clamped securely to the under side of the tread of the rail by the transverse clamping screw $o'$. When the clamping screw is tightened, the clamps grip the rail and prevent movement of the jack screws, and, therefore, movement of the machine. Before clamping, the jack screws are turned to lift the machine high enough for the rails to free the truck wheels from the latter. When the corner-cutting has been completed, the machine is again lowered upon its trucks and the clamps loosened. Obviously, other ways of giving a rigid support to the machine during corner-cutting may be employed, and if desired, the jack screws may rest directly upon the quarry bottom, or in holes drilled in the quarry bottom, but the support directly upon the rails is usually more convenient and even.

Figure 11:
Figure 12:
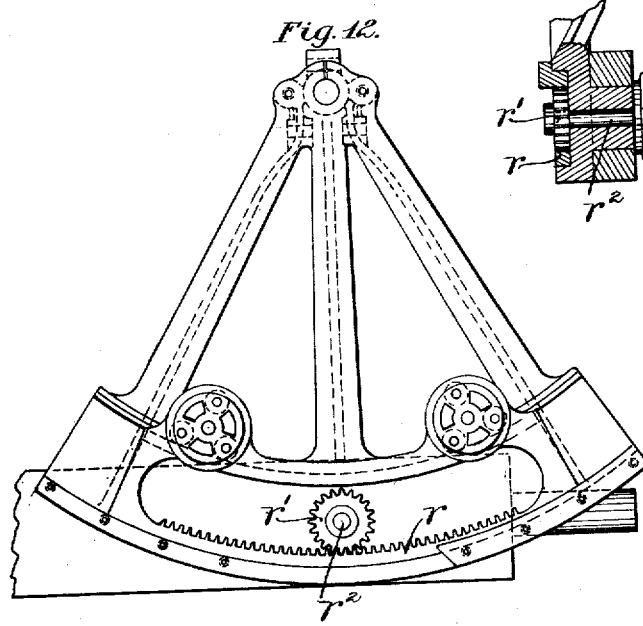

The driving means described for the sliding segment is practical and convenient, but other means may be employed, such for example, as shown in Figs. 10 and 11.

Referring to the modification there illustrated, the sliding actuator or segment instead of being connected with the driving chain by a flexible connection, is at its lower edge formed into a segmental gear $p$ which meshes with a pinion $p'$ journaled upon the depending tongue of the standard, the pinion being secured to a rotatable sprocket $p^2$ which is driven by the sprocket chain engaging the main driving sprocket as before.

Figure 13:
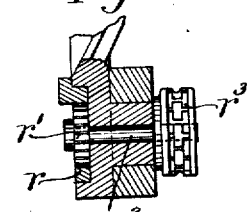

In Figs. 12 and 13 there is shown a modified construction wherein the sliding actuator segment is provided with an internal gear $r$ meshing with the pinion $r'$, the latter mounted to rotate with the shaft $r^2$, secured to the sprocket $r^3$ at the back of the support, said sprocket being driven by a suitably connected driving chain.

Figure 14:
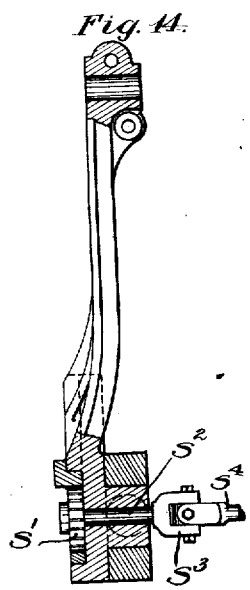

Fig. 14 shows a modification similar to that in Figs. 12 and 13, the shaft $s^2$, however, being connected through the medium of a universal joint $s^3$ to a driving shaft $s^4$ which may be directly driven from the tool actuating engine with the interposition of suitable clutching mechanism.

Figure 15:
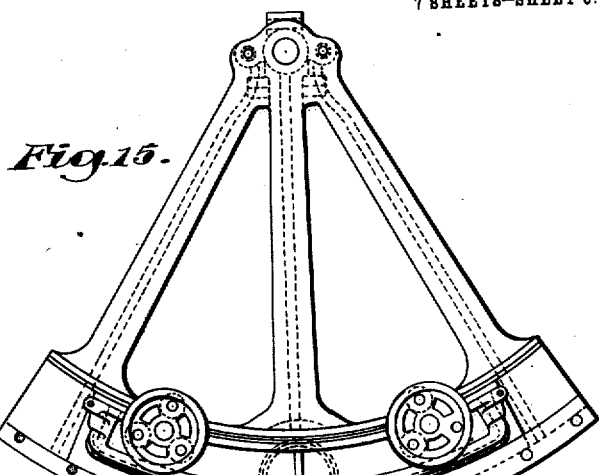
Figure 16:
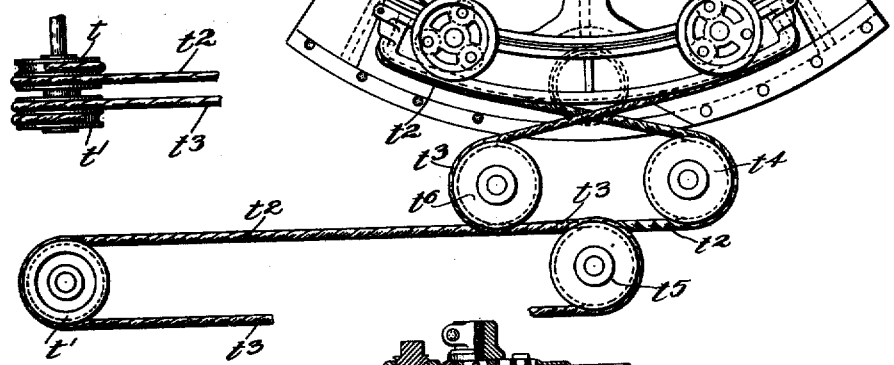

In Figs. 15 and 16 is shown the application of a rope drive to the moving segment. Oppositely spiraled drums $t$ and $t'$ are provided to which are attached respectively the ropes $t^2$ and $t^3$, the former being connected to one end of a segment after passing over the idle sheave $t^4$, and the latter connected to the opposite end of the segment after passing over first the sheave $t^5$ and then the sheave $t^6$. The drums are mounted upon a driving shaft which may be mounted for rotation like the sprocket driving wheel in the modification as described, whereby rotation of the shaft causes one drum to wind up its rope and the other to unwind.

In Fig. 17 there is shown a modification wherein the standard $u$ provides a circular guideway for the sliding actuator $u'$ which herein is no longer segmental in form, but in the form of an annular plate adapted, if desired, to make a full revolution in the standard. The cutter-head may be bolted rigidly to the spotting $u^2$ upon this plate and when moved through the agency of the driving pinion $u^3$ meshing with the gear $u^4$ upon the edge of the plate, the cutter-head may be oscillated as before, but the amplitude of the angle of oscillation may be increased to any desired extent. With this construction the cutting may be made in either the right or left hand wall of the quarry, or in the bottom or at the right or left hand corners.

While we have herein illustrated our invention as applied to a channeling machine and a channeling machine of the type shown, it is to be understood that not only may the described details of construction and arrangement of parts be widely deviated from, without departing from the principles of the invention, but that many applications thereof may be made and many embodiments thereof employed which are unnecessary to refer to in the description herewith.

We claim.

1. A channeling machine having a carriage, a cutter-head, a support upon which the same is mounted for swinging movement, means permitting the carriage with the support to be progressively moved lengthwise the channel groove, a tool-connected engine upon the cutter-head for reciprocating the tool, mechanically driven means for swinging the cutter-head with a substantially uniform movement about its pivotal support also lengthwise the channel groove.

2. A channeling machine having a carriage, a reciprocating tool, power-actuated means for reciprocating the tool upon its carriage to and from the work, and mechanically driven means for moving the tool lengthwise its carriage and lengthwise the channel groove with a substantially uniform movement.

3. A channeling machine provided with a carriage, a cutting tool having a reciprocatory percussive cutting movement to and from the work, said machine being adapted to be moved progressively for cutting an ordinary longitudinal channel groove, means for maintaining said carriage stationary, and means for giving the tool a swinging reciprocating movement in the plane of the channel groove for corner cutting while thus stationarily maintained.

4. A channeling machine having a channeling tool provided with a cutting end, tool reciprocating means for giving the tool a percussive cutting movement to cut an ordinary longitudinal channel groove during progressive travel of the machine lengthwise the same, and means for corner cutting in the plane of the channel groove while still maintaining the cutting end of the tool perpendicular to the bottom of the groove.

5. A percussive channeling machine having a channeling tool provided with a cutting end, means for cutting an ordinary longitudinal channel groove during progressive movement of the machine lengthwise the channel groove while the tool is undergoing reciprocation, and means for completing the channel groove under an inclined side wall of the quarry by a movement of the tool along the arc of a circle and in the plane of the channel groove while still undergoing reciprocation to and from the work.

6. A channeling machine having a percussive channeling tool provided with a cutting end, tool reciprocating means, means for cutting an ordinary longitudinal channel groove during progressive movement of the machine lengthwise the channel groove while the tool is undergoing reciprocation, and means for completing the channel groove under an inclined side wall of the quarry by a reciprocating movement of the tool along the arc of a circle and in the plane of the channel groove while still undergoing reciprocation to and from the work.

7. A channeling machine having a traveling carriage, pivotally mounted oscillatory tool carrying means, a support therefor, and means for adjusting said support about an axis transverse to the path of movement of the channeling machine to vary the limit of oscillation of the tool carrying means.

8. A channeling machine having a traveling carriage, a support, tool-carrying means mounted for swinging movement about said support lengthwise the channel groove and permitting oscillation of the tool under and out from an overlying side wall, and means for adjusting the support about a pivotal axis transverse to the channel groove.

9. A channeling machine having a support, tool-carrying means mounted for swinging movement about said support, and means for adjusting said support either about an axis transverse to said machine or an axis lengthwise the same.

10. A channeling machine having a support, a trunnion for said support having its axis transverse to said machine, tool-carrying means pivotally mounted upon said support about an axis parallel with but above said trunnion, and means for moving said tool-carrying means about its pivot during reciprocation of the tool.

11. A channeling machine having a support, a trunnion having its axis transverse to the machine upon which said support is adjustably fixed, tool-carrying means upon said support, means for swinging said tool carrying means independently upon the support while the tool is undergoing reciprocation, and means for adjustably inclining said trunnion and said support about an axis lengthwise the machine.

12. A channeling machine having a support, a reciprocatory tool, means also for swinging the tool during reciprocation, a trunnion having its axis transverse to the machine upon which said support is adjustably fixed, means for adjustably inclining said trunnion and said support about an axis lengthwise the machine, and also for changing the position of the trunnion lengthwise the machine.

13. A channeling machine having a support, a trunnion having an axis transverse to the machine upon which said support is adjustably fixed, tool-carrying means swingingly mounted upon the support, and means permitting the shifting of said trunnion lengthwise the machine.

14. A channeling machine having a support, tool-carrying means mounted upon said support so as to permit power-driven reciprocation of said tool while the tool-carrying means is caused to swing through the arc of a circle upon said support at one end of the machine, and means permitting the shifting of said support in the same direction as the swinging of said tool-carrying means to provide, when desired, for the oscillatory movement of said tool-carrying means at the opposite end of said machine.

15. In a channeling machine, the combination with a percussive channeling tool provided with a cutting end, of a support upon which the same is pivotally mounted for swinging movement, means to hold the support rigidly fixed upon the quarry bottom adjacent an overhanging side wall of the quarry and with the tool positioned to swing reciprocatively through a plane transverse to the quarry bottom from an upright position to a forwardly inclined position beneath said wall, and means for swinging the tool about its pivotal support to extend the channel in the quarry bottom beneath the overhanging side wall.

16. A channeling machine having a support, tool-carrying means carrying a power-driven reciprocating tool mounted upon said support, power driven means for swinging said tool-carrying means, and means for adjusting said support about an axis lengthwise the machine for angle cutting.

17. A channeling machine having an upright support, tool-carrying means pivotally secured to said support, a sliding actuator segment adapted to move in a suitable guideway below said pivotal connection, means for attaching said tool-carrying means to said actuator segment, and means during the reciprocation of the tool for causing reciprocatory movement of said actuator segment.

18. A channeling machine having an upright support, tool-carrying means pivotally secured to said support, a sliding actuator adapted to move in a suitable guide-way below the pivotal connection, means for attaching said tool-carrying means to said actuator, and power-driven means for moving said actuator.

19. A channeling machine having an upright support, tool-carrying means pivotally connected to the same, a sliding actuator segment secured to said tool-carrying means, and means acting through said actuator segment to move the tool-carrying means about said support.

20. A channeling machine having an upright support, means for adjusting said support lengthwise the machine, swinging tool-carrying means mounted upon said support and an actuator mounted for sliding movement in said support, and means connecting said actuator to said tool-carrying means in any one of a plurality of positions.

21. A channeling machine having a support, tool-carrying means mounted for swinging movement upon said support, means for adjusting said tool-carrying means for corner-cutting to overhang one end of said machine for forward inclination in the direction of swinging movement or to adjust the same to overhang the opposite end with a reverse inclination, and means for imparting a swinging movement to the tool-carrying means toward and away from its forwardly inclined position during reciprocation of the tool.

22. In a channeling machine, an upright support, tool-carrying means pivotally mounted upon said support, power-driven means for causing movement of said tool-carrying means upon its pivot, power transmission mechanism for transmitting movement from said power-driven means to said tool-carrying means, and a chain and sprocket connection between said tool-carrying means and said power transmission mechanism.

23. A channeling machine having a carriage, a cutter head, a support, a trunnion upon which said support is adjustably fixed, a trunnion shaft lengthwise the machine and along which said trunnion may be adjusted, power transmission mechanism carried by said trunnion shaft and means connecting said power transmission mechanism and said cutter-head for communicating movement to the latter.

24. A channeling machine having a support adapted to be fixed at one end of the machine, a swinging cutter-head mounted upon said support, power transmitting mechanism at the opposite end of the machine for swinging the said cutter-head, said power transmitting mechanism and said support being adjustable whereby their positions may be reversed upon said machine.

25. A channeling machine having a carriage, a shaft fixedly secured to said carriage and extending lengthwise the same, an adjustable clamp upon said shaft carrying a trunnion having an axis transverse to the machine, an upright support adjustably fixed at its lower end upon said trunnion, a cutter-head pivoted to the upper end of said support, power transmission mechanism adjustably secured at the opposite end of said trunnion shaft, an actuator slidably mounted in a curved guide-way in the lower part of said support and secured to said cutter-head, a flexible connection secured to the opposite ends of said guide-way and connected to said power transmission mechanism, and power driven means for imparting reciprocatory movement to said cutter-head through said power transmission means.

26. A channeling machine having a carriage, a support thereon adjustable about an axis lengthwise the cutting plane, a cutter head pivotally mounted on the support to swing lengthwise the cutting plane, a tool reciprocating engine mounted on the cutter head, power transmitting mechanism including a rotatable member axially alined with the tipping axis of said support and 27. A channeling machine having a tool carrying member, a support therefor adjustable for angle cutting about an axis lengthwise the channel groove, means for imparting cutting movement to the tool and means for simultaneously swinging the tool carrying member through the arc of a circle, said swinging means including a power transmission member axially alined with the said axis of said support.

28. A channeling machine having in combination a cutter-head G, a reciprocatory tool carried thereby, a support $a$, a trunnion box $h$ providing means for adjustably tipping the support about an axis lengthwise the channel groove, and tool swinging connections for swinging the tool lengthwise the channel groove, including a gear $f^{14}$ alined with the tipping axis of the support.

29. A channeling machine having a carriage provided with means for engaging with a trackway to permit the progressive movement of the machine along the same, a channeling tool having a cutting end, a cross head from which the tool projects for at least the depth of the channel groove, a tool reciprocating engine, a cutter head on which said cross head and engine are mounted, said cutter head being located near the side of the machine to permit the cutting of a channel groove lengthwise the carriage, means on the cutter head for feeding the cross head and engine toward the work, means for stationarily securing the carriage in a given position upon the track-way, a support upon which said cutter head is mounted for swinging movement about an axis transverse to the cutting plane, said support being adjustable upon said carriage about an axis lengthwise the cutting plane, thereby to change the angle of inclination of the channel groove, an engine upon the carriage, driving connections between the engine and the cutter head to cause the latter to undergo swinging movement upon the support and reversing means for reversing the swinging movement, said cutter head being so mounted as to permit its adjustment to a forward inclination in advance of either end of the machine and its swinging movement through an arc determined by the forward inclination.

30. A channeling machine having a carriage provided with means for engaging with a trackway to permit its progressive movement along the same, cutting means upon said carriage for cutting an ordinary channel groove, means for stationarily securing the carriage in a given position upon the track, and means for simultaneously giving said cutting means a swinging movement in addition to its cutting movement.

31. A channeling machine having a pivoted cutter head, a reciprocatory channeling tool mounted on said cutter head and having a cutting end, means for holding said cutter head fixed during the cutting of the longitudinal channel groove, means, for imparting swinging movement to the same simultaneously with the reciprocatory movement of the tool after completion of the principal portion of the channel groove, a carriage for said machine having means for engaging with a trackway to permit the progressive movement of the machine along the same, and means for stationarily securing the same in a given position upon the track.

32. A channeling machine having a carriage provided with means permitting its progressive movement while cutting the ordinary longitudinal channel groove, a percussive channeling tool provided with a cutting end, a cross head from which said tool projects for at least the depth of the channel groove, means for reciprocating said tool to advance its cutting end against or retract the same from the bottom of the channel groove, means for stationarily securing the carriage in a given position, and means permitting the simultaneous swinging movement of said reciprocating tool lengthwise the channel groove for corner cutting.

33. A channeling machine having a carriage permitting its progressive movement while cutting the ordinary longitudinal channel groove, reciprocatory cutting means, a swinging support for said cutting means permitting swinging movement thereof lengthwise the channel groove, means for feeding the cutting means upon said support toward the work, means for imparting swinging movement to said cutting means simultaneously with its reciprocations, and means for holding the carriage fixed during the said swinging movement.

34. A channeling machine having a carriage, a support mounted for tipping movement about an axis parallel with the longitudinal channel groove, a cutter head pivoted upon said support adjacent to the side of the machine, an engine upon said cutter head, a reciprocatory tool also thereon connected to be reciprocated by said engine, and means for swinging said cutter head simultaneously with the cutting movement of the tool lengthwise the channel groove.

35. A channeling machine having a carriage, a cutter-head mounted on the carriage for swinging movement lengthwise the channel groove and in the direction of the travel of the carriage, cutting means upon said head, power-actuated means for imparting cutting movement to the cutting means, and power-actuated means for swinging the cutter head during the cutting movement.

36. A channeling machine having a carriage, a support at the side of the carriage mounted for tipping adjustment about an axis lengthwise the cutting plane, a cutter head mounted for swinging movement at the side of said support to overhang the side of said carriage, cutting means upon said cutter head, an engine also thereon for imparting cutting movement to said cutting means and mechanically operated driving connections for imparting swinging movement to said cutter head lengthwise the channel groove simultaneously with the cutting movement of said cutting means.

37. A channeling machine having a carriage, a tool support at the side of the carriage, cutting means thereon, means for imparting cutting movement to said cutting means, and means for swinging said tool support lengthwise the channel groove simultaneously with the movement of the cutting means, said support holding the cutting means at a forward inclination from either end of the machine to permit its swinging movement toward and from said forwardly inclined position for corner cutting in advance of the machine.

38. A channeling machine having a carriage, a supporting frame mounted for tipping adjustment at the side of the carriage about an axis lengthwise the cutting plane, a cutter head pivoted upon said support for swinging movement lengthwise the cutting plane, reciprocatory tool carrying means on said cutter head, an engine connected thereto also on said head, mechanically operated driving connections for imparting swinging movement to said cutter head lengthwise the cutting plane simultaneous with the reciprocations of the tool, and means for reversing the swinging movement of said head.

39. A channeling machine having reciprocatory tool carrying means, a swinging support therefor mounted to swing lengthwise the cutting plane, mechanically driven means for swinging said support at a predetermined rate of movement simultaneously with the reciprocations of said tool and gearing connections between the power driven means and the support.

40. A channeling machine having reciprocatory tool carrying means, a swinging support therefor, a motive device also on said support for imparting cutting movement to the tool carrying means, power driven means for swinging said support simultaneously with the reciprocation of the tool carrying means, gearing connections between the power driven means and the support and means for reversing the swinging movement.

41. A channeling machine having a carriage, a support at the side of the carriage, tool carrying means pivotally mounted upon the support, power driven means for causing movement of said tool carrying means upon its pivot lengthwise the channel groove, and power transmission devices including a driving chain for transmitting movement from said power driven means to said tool carrying means.

42. A channeling machine having tool reciprocating means for cutting an ordinary longitudinal channel groove and power driven means for swinging the tool support at a predetermined rate of /ement lengthwise the channel groove ⸱.⸳ corner cutting thereby maintaining the tool perpendicular to the bottom of the groove.

43. A channeling machine having a carriage, a supporting frame mounted on trunnions at one side thereof, a cutter head pivoted at the side of said support to overhang the carriage, and transmission devices for swinging said cutter head including a power transmission shaft alined with said trunnions.

44. A channeling machine having a reciprocatory channeling tool mounted to permit a swinging movement lengthwise the channel groove, and means for swinging said tool during its reciprocation, said means including a flexible driving connection.

45. A channeling machine having a carriage, a percussive channeling tool provided with a cutting end, a support for said tool upon which the same is pivotally mounted for swinging movement, and power-driven means for moving the tool about its pivotal support, the range of swinging movement of said tool being sufficient to swing said tool from a forwardly inclined position to or through an upright position upon its pivotal support.

46. A channeling machine having a carriage, an engine, a cross-head and a tool fixedly secured to said cross-head, and a support upon which said engine and tool-carrying cross-head are mounted for swinging movement lengthwise the channel groove during reciprocation of the tool, said support being mounted at the side of the carriage to permit the reciprocation of the tool while swung through the arc of a circle for corner cutting or reciprocation of the tool in a fixed upright position for cutting the ordinary channel groove.

47. A channeling machine having a carriage, a support on said carriage, a reciprocatory tool pivotally mounted upon said support, the reciprocatory path of said tool intersecting the axis of swinging movement, means for reciprocating said tool, and means for simultaneously swinging the same lengthwise the channel groove.

48. In a channeling machine, the combination with a percussive channeling tool provided with a cutting end, of a support upon which the same is pivotally mounted for swinging movement, means to hold the support rigidly fixed upon the quarry bottom adjacent an overhanging side wall of the quarry and with the tool positioned to swing reciprocatively through a plane transverse to the quarry bottom from an upright position to a forwardly inclined position beneath said wall, and power-driven means for swinging the tool about its pivotal support to extend the channel in the quarry bottom beneath the overhanging side wall.

49. In a channeling machine the combination with a frame A of a channeling tool F, motive means for giving the tool a reciprocatory percussive movement, a support G on which the tool is carried, an adjustable support a on which the support G is pivotally mounted, means for releasably holding said support G fixed while the machine is advanced to cut the ordinary channel groove, said support G when released permitting a swinging movement for corner cutting, and means such as the clamps O to hold the frame fixed for corner cutting.

50. In a channeling machine, the combination with a frame A, means, such as the clamp O, to fix it rigidly on the quarry bottom adjacent the overhanging side wall of the quarry, a percussive channeling tool F, a tool-carrying support G held on the frame to swing over the quarry bottom from a vertical position to a forwardly inclined position to cut the groove in the quarry bottom and under the overhanging wall, and means, such as the engine e, to swing the support while the tool is cutting.

51. The method of cutting a channel groove in the bottom of a quarry provided with an oblique or overhanging side wall which consists in progressively moving a cutting implement while held at a fixed angle relatively to the quarry bottom and percussively cutting a longitudinal channel in the said bottom, stopping such channel short of the side wall of the quarry and separately cutting the channel under the said overhanging wall by reciprocatively moving a cutting implement at a changing angle formed and under the said wall and in the line of the plane of the channel groove while causing it percussively to strike the bottom of the cut.

52. A channeling machine having a wheeled truck, a tool support at the side thereof, a reciprocatory tool, said truck being movable during the operation of the tool to cut a continuous channel groove, and means for swinging the tool lengthwise the channel groove while cutting.

53. In a channeling machine the combination with a movable carriage, a tool mounted at the side of the carriage, and adapted to be held fixed thereat to cut a channel groove and means at will for releasing the tool and imparting to the same an angle movement on the carriage through the plane of the channel groove to extend the cut of the latter.

In testimony whereof, we have signed our names to this specification in the presence of two subscribing witnesses.

ALBERT BALL.
HENRY H. MERCER.

Witnesses:
H. C. BERKEY,
FRANK A. BALL.

---

Copies of this patent may be obtained for five cents each, by addressing the "Commissioner of Patents, Washington, D. C."

Correction in Letters Patent No. 1,011,145.

It is hereby certified that in Letters Patent No. 1,011,145, granted December 12, 1911, upon the application of Albert Ball and Henry H. Mercer, of Claremont, New Hampshire, for an improvement in "Stone-Cutting Machines," an error appears in the printed specification requiring correction as follows: Page 10, line 44, for the word "formed" read *forward;* and that the said Letters Patent should be read with this correction therein that the same may conform to the record of the case in the Patent Office.

Signed and sealed this 16th day of January, A. D., 1912.

[SEAL.]

C. C. BILLINGS,
*Acting Commissioner of Patents.*